United States Patent
Nohara et al.

[11] Patent Number: 5,172,054
[45] Date of Patent: Dec. 15, 1992

[54] BEARING APPARATUS FOR A DRIVEN SHAFT OF AN AUTOMOBILE, HAVING A COMPACT AND EASILY MOUNTABLE ROTATIONAL SPEED DETECTOR

[75] Inventors: Makoto Nohara; Tsuyoshi Okumura, both of Osaka, Japan

[73] Assignee: Koyo Seiko Co., Ltd., Osaka, Japan

[21] Appl. No.: 673,756

[22] Filed: Mar. 25, 1991

Related U.S. Application Data

[60] Division of Ser. No. 626,311, Dec. 13, 1990, abandoned, which is a continuation of Ser. No. 469,183, Jan. 24, 1990, abandoned.

[30] Foreign Application Priority Data

Jun. 2, 1989 [JP]   Japan ................... 1-141777

[51] Int. Cl.$^5$ .................. G01P 3/488; B60T 8/32; H02K 21/26
[52] U.S. Cl. ..................... 324/166; 324/173
[58] Field of Search ............. 324/174, 175, 166, 160, 324/163; 310/155, 168, 67 R, 68 R; 174/52.2

[56] References Cited

U.S. PATENT DOCUMENTS

| | | | |
|---|---|---|---|
| 3,626,227 | 12/1971 | Ritsema | 324/174 |
| 4,024,483 | 5/1977 | Tomczak et al. | |
| 4,847,557 | 7/1989 | Saito et al. | |
| 4,970,462 | 11/1990 | Richmond | 324/174 |

FOREIGN PATENT DOCUMENTS

| | | |
|---|---|---|
| 1913814 | 10/1970 | Fed. Rep. of Germany . |
| 3620884.1 | 12/1987 | Fed. Rep. of Germany . |
| 8800370.1 | 6/1989 | Fed. Rep. of Germany . |
| 2325935 | 4/1977 | France . |
| 63-166601 | 7/1989 | Japan . |
| 1353306 | 5/1974 | United Kingdom . |

OTHER PUBLICATIONS

Patent Abstracts of 63-166601, vol. 12, No. 432 (M763)[3279], Nov. 15, 1988, p. 37.

Primary Examiner—Walter E. Snow
Attorney, Agent, or Firm—Wenderoth, Lind & Ponack

[57] ABSTRACT

A bearing apparatus is capable of detecting rotational speed of a driven shaft of an automobile. The bearing apparatus has a rotational speed detector and a detected member. The detected member is fixed to an inside member rotating with the driven shaft. The detected member has a hollow cylindrical portion which extends in an axial direction and is provided with a plurality of projections at even intervals in a circumferential direction on its inner peripheral surface. The rotational speed detector is fixed to a cover for covering the rotational speed detector and the detected member. A detector portion of the rotational speed detector is positioned within the hollow cylindrical portion so as to oppose the projections.

4 Claims, 4 Drawing Sheets

BEARING APPARATUS FOR A DRIVEN SHAFT OF AN AUTOMOBILE, HAVING A COMPACT AND EASILY MOUNTABLE ROTATIONAL SPEED DETECTOR

This is a divisional application of application Ser. No. 07/626,311, filed on Dec. 13, 1990, now abandoned which is a continuation application of now abandoned application Ser. No. 07/469,183, filed on Jan. 24, 1990.

BACKGROUND OF THE INVENTION

1. Field of the invention

The present invention relates to a bearing apparatus of a type used for bearing a driven shaft of an automobile and having a rotational speed detector which detects the rotational speed of the wheels connecting with the shaft so that the wheels do not lock, when brakes are suddenly applied on a frozen road, for example, by controlling the brakes according to the detected rotational speed.

2. Description of prior art

In general, the rotational speed of a wheel is detected by a rotational speed detector having a built-in permanent magnet and coil in association with a pulser ring which is formed of a powerful magnet body and has a plurality of gear-teeth-like projections. Specifically, when the pulser ring is rotated in conjunction with the wheel, magnetic flux issued from the permanent magnet is varied by the projections of the pulser, and AC voltage of a frequency proportional to the rotational speed of the pulser ring is generated in the coil. It is therefore possible to obtain the rotational speed of the pulser ring by detecting the frequency of the AC voltage.

According to a conventional bearing apparatus, the gear-teeth-like projections are provided on the outer periphery of the pulser ring which is fitted on the outer periphery of an outer ring, for example, of the bearing apparatus. In this case, the rotational speed detector is provided radially outside of the pulser ring. The rotational speed detector extends in a radial direction with its sensor portion placed opposite the projections. This structure increases the size, especially in the radial direction, of the bearing apparatus. In addition, the rotational speed detector is required to be precisely positioned relative to the projections of the pulser ring in order to realize a precise detection of the rotational speed. However, it is not easy to precisely position the rotational speed detector during its mounting operation, because the position of the rotational speed detector must be adjusted in the direction in which the rotational speed detector is mounted. In order to realize a precise positioning, very precise work is also required.

According to another conventional bearing apparatus, the projections are formed on an end face of the pulser ring. In this case, the pulser ring is mounted to an end of one of the outer and inner rings of the bearing apparatus which rotates with a wheel, and the rotational speed detector opposes the projections of the pulser ring in the axial direction. In this case, the size in the axial direction of the bearing apparatus becomes large. In addition, similar to the above case, it is not easy to precisely position the rotational speed detector during its mounting operation, because the position of the rotational speed detector must be adjusted in the direction in which the rotational speed detector is mounted in this case too. In order to realize a precise positioning, very precise work is also required.

SUMMARY OF THE INVENTION

Therefore, the object of the present invention is to reduce the size of the bearing apparatus of the aforementioned type and also to realize an easy positioning of the rotational speed detector relative to the projections of a detected member such as the pulser ring.

In order to achieve the above object, in a bearing apparatus for a driven shaft of an automobile comprising a cylindrical outside member adapted to be mounted to a chassis of the automobile in surrounding relation to the driven shaft; a cylindrical inside member mounted concentrically within said cylindrical outside member and adapted to be fixed for rotation with the driven shaft; means, comprising rolling elements, for rotatably mounting said cylindrical inside member within said cylindrical outside member for rotation relative to said cylindrical outside member; a detected member having a plurality of projections spaced at even intervals from each other; and a rotational speed detector including means for detecting rotational speed of the detected member and for generating a rotational speed signal indicative of the rotational speed of the driven shaft, a bearing apparatus according to the present invention is characterized by the following features.

The detected member, which is of a cylindrical shape, is fixed to the cylindrical inside member for rotation therewith about an axis and has a hollow cylindrical portion which extends in an axial direction. The hollow cylindrical portion has a plurality of projections spaced evenly apart in a circumferential direction of the hollow cylindrical portion on its inner peripheral surface.

The bearing apparatus according to the present invention further has a cover member which is connected to the cylindrical outside member so as to cover the cylindrical detected member.

The rotational speed detector is fixed to the cover member so that the means for detecting rotational speed is positioned within the hollow cylindrical portion and opposes the projections of the cylindrical detected member.

According to the present invention, because the projections are provided on the inner peripheral surface of the hollow cylindrical portion in a manner projecting radially inward and the means for detecting the rotational speed is housed in the hollow cylindrical portion, the size of the bearing apparatus can be made small.

The rotational speed detector is assembled in an axial direction so that the rotational speed detector, more specifically the means for detecting of the rotational speed detector extends substantially in parallel with the inner peripheral surface of the hollow cylindrical portion. In this case, a direction in which the rotational speed detector is mounted is different from a direction in which the rotational speed detector should be positioned relative to the projections. Therefore, it is not necessary to precisely adjust the position of the rotational speed detector in the mounting direction. This realizes an easy mounting of the rotational speed detector. In addition, a very precise work is not required for the same reason.

If a direction in which the rotational speed detector is mounted is identical to a direction in which the rotational speed detector should be positioned relative to the projections of the detected member, a clearance between the rotational speed detector and the projections is subjected to change with time due to looseness of connection and therefore it is necessary to always pay attention to the position of the rotational speed detector to keep precisely detecting the rotational speed of the driven shaft for a long time. However, according to the present invention, because the mounting direction is different from the direction in that the rotational speed detector should be positioned relative to the projections, a change with time in a clearance in the mounting direction between the rotational speed detector and the detected member can be neglected.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
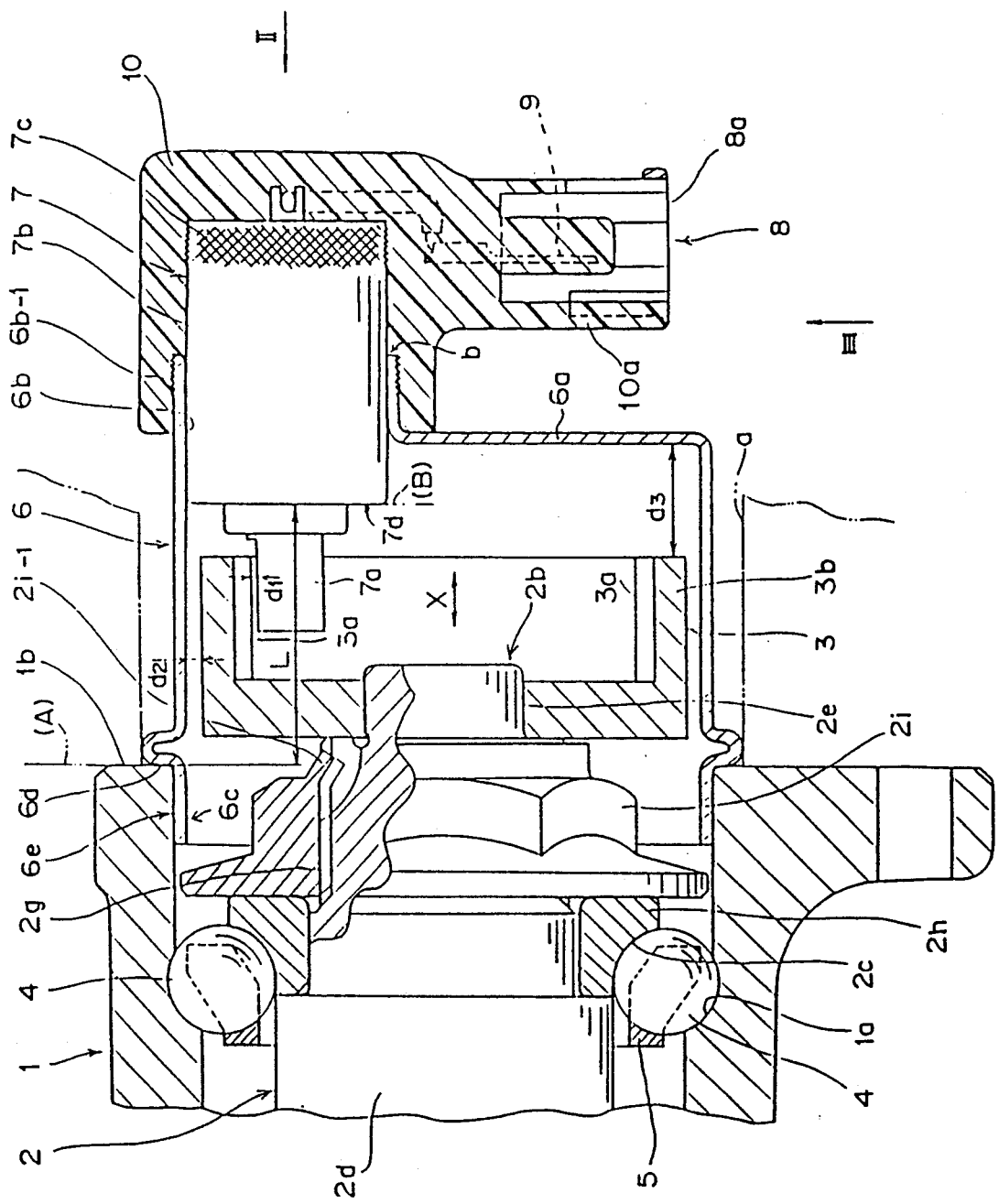
FIG. 1 is a cross sectional view taken along the axial direction of an essential part of a preferred embodiment of the present invention, showing a cover, a rotational speed detector, and a connector which are embedded in a resin block.

Referring now to FIG. 1, reference number 1 is a cylindrically shaped outside member mounted to a suspension member 'a' of a chassis of an automobile (not shown), and 2 is a cylindrically shaped inside member which includes a driven shaft 2d extending inside of the outside member 1 in the axial direction indicated by arrow X. On one end of the inside member 2 which would be at the left side of FIG. 1 but which is not shown in this figure is a flange to which is to be mounted a wheel, and to the other end 2b of the inside member 2 is attached a detected member 3. This detected member 3 having a U-shaped cross section includes a hollow cylindrical portion 3b. The hollow cylindrical portion 3b is provided with multiple projections 3a (only two of them are shown) evenly spaced from each other around its inside circumference. Mounting of the detected member 3 to the end 2b is accomplished by means of press fitting of the detected member 3 on a round post-shaped fitting portion 2e.

Reference numbers 4 represent the rolling elements which roll between a raceway surface 1a of the outside member 1 and a raceway surface 2c of the inside member 2. Although not shown in FIG. 1, two rows of rolling elements are provided as are the raceway surface 1a of the outside member 1 and the raceway surface 2c of the inside member 2. The inside member 2 is rotatably held by the outside member 1 through the double rows of the rolling elements 4.

A retainer 5 holds the rolling elements 4 evenly spaced apart in the circumferential direction of the inside member. A second retainer is, of course, provided for holding the second row of the rolling elements which are not shown in FIG. 1.

An annular raceway member 2h having the raceway surface 2c on its outer periphery is fixed to the driven shaft 2d by means of a nut 2i which is screwed onto a threaded portion 2g of the driven shaft 2d. The nut 2i is locked to the driven shaft 2d by bending a tab 2i−1 projecting from the nut 2i into a notch provided at a specified position of the threaded member 2g. In this way the nut 2i is prevented from loosening from the driven shaft 2d.

Reference number 6 represents a cover mounted to the outside member 1 and having a semi-closed, cylindrical shape. At a specified position in its free end 6a is provided a fitting hole (or opening) 6b, and at its open fixed end 6c is provided a fitting 6e having a seat 6d projecting outwardly in the radial direction. The seat 6d rests against an end surface 1b of the outside member 1 when the cover 6 is mounted to the outside member 1.

Reference number 7 represents a rotational speed detector which is fit to the fitting hole 6b of the cover 6. The rotational speed detector 7 has a main body 7b and a detector portion 7a which are aligned in the axial direction X. When the cover 6 is mounted to the outside member, the rotational speed detector 7 is positioned accurately relative to the cover 6 such that the detector portion 7a is spaced radially by a distance d1 from the projections 3a when the projections 3a are at the top of the detected member 3 as shown in FIG. 1.

Because the inner space of the hollow cylindrical portion 3b of the detected member 3 is effectively used for the detector portion 7a, the bearing apparatus can be made compact.

Figure 2:
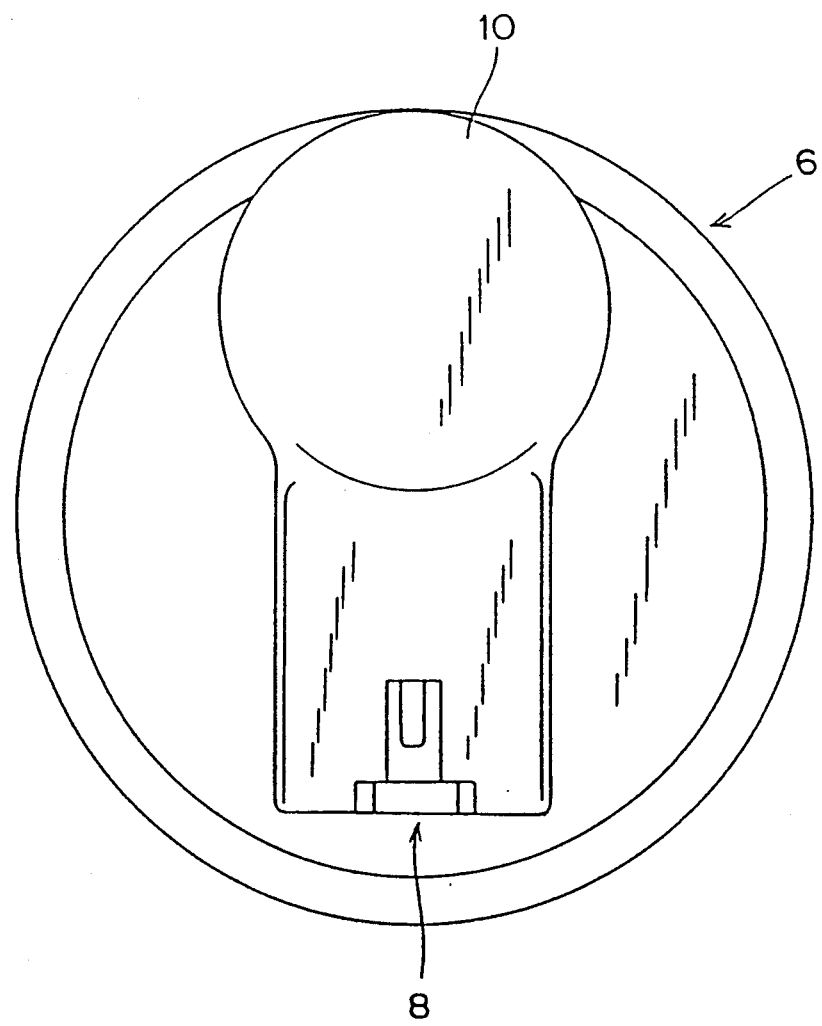
FIG. 2 and FIG. 3 are elevation views in the directions of arrows II and III, respectively, of the cover, the rotational speed detector, and the connector of FIG. 1 which are in a resin block.

The cover 6 and the rotational speed detector 7 are connected to each other by a one-piece resin block 10 formed about the detector 7 and the cover 6 through the use of plastic molding techniques. In other words, both the detector 7 and the cover 6 are embedded in the resin block 10. As shown in FIGS. 1 and 2, the resin block 10 is mounted such that it is entirely within the largest diametric dimension of the cover 6 as projected in an axial direction.

Figure 3:
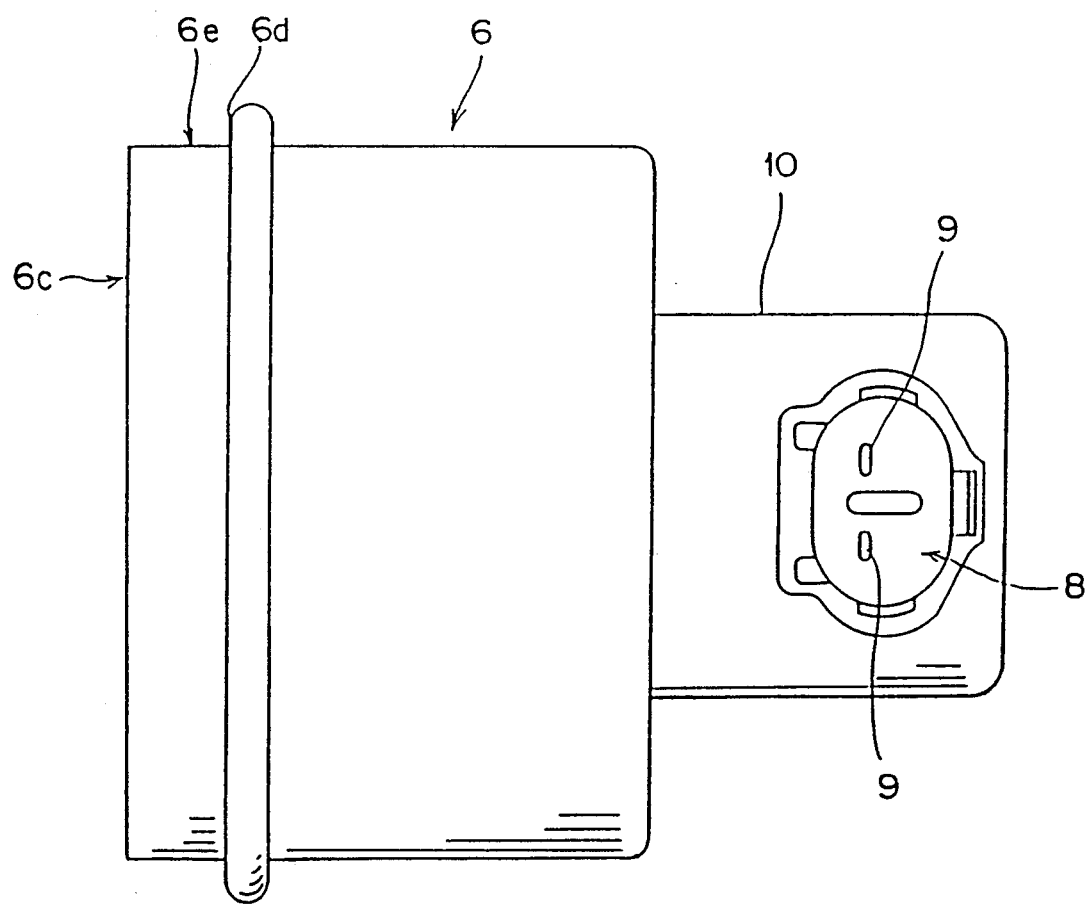

Reference number 8 represents a connector molded integrally with the resin block 10 at a specified position relative to the cover 6 and the rotational speed detector 7. Thus, the cover 6, rotational speed detector 7 and connector 8 provide an assembly of integral construction with the help of the resin block 10. The connector 8 consists of a connector housing 10a and a pair of terminals 9 (see FIGS. 1 and 3). The connector housing 10a is formed by using a molding die of a corresponding shape. Therefore, it is not necessary to use a separate connector housing. A hole or opening 8a formed in the connector housing 10a extends in the direction perpendicular to the axial direction X. The pair of terminals 9 is provided at a portion defining a base of the connector housing 10a. A plug (not shown) which is complementary to the connector 8 can be connected to the connector 8 for extracting a detected rotational speed signal from the rotational speed detector 7. The detected rotational speed signal is sent through the connector 8 to an antilock brake system, which is not shown in the figure.

The cover 6 includes an annular flange "b" formed about the opening 6b for connecting the resin block 10 to the cover 6. This allows the opening 6b to be completely sealed by means of being completely covered with the resin block 10 to a specified thickness. The fitting portion 6e of the cover 6 is also tightly fitted to the outside member 1. Therefore, once the integrally molded cover, rotational speed detector and connector are mounted to the outside member as shown in FIG. 1, the penetration of water and other foreign matter to the inside of the cover 6, such as may occur in a conventional bearing apparatus wherein a rotational speed detector is press fit to a cover, is effectively prevented.

Furthermore, the peripheral surface of the main body 7b of the rotational speed detector 7 at an end 7c is knurled, and an outside surface 6b-1 of the fitting hole 6b of the cover 6 is likewise knurled. These knurled surfaces help assure a more positive anchor and sufficient rigidity in the resin 10 when the cover 6, rotational speed detector 7, and connector 8 are molded together. Therefore, even if vibrations or other outside factors work on the cover 6, the position of the rotational speed detector 7 will not shift in the axial direction relative to the cover 6, and the rotational speed detector 7 will not become biased with respect to the axis X. In short, high vibration resistance is assured.

In the dies used for molding the resin block 10, a reference face (A) used to position the seat 6d of the cover 6 and a reference face (B) used to position an end 7d of the main body 7b of the rotational speed detector 7 are provided at a specified distance L from each other. By setting the seat 6d of the cover 6 at the reference face A and at the same time by setting the end 7d of the rotational speed detector 7 at reference face B, the cover 6, the rotational speed detector 7, and the terminals 9 of the connector 8 are molded into an integrated member with the rotational speed detector 7 mounted with high precision to the cover 6. As described above, the connector housing 10a is formed during this molding process. When the integrated member 6, 7, 8 is mounted in place by merely mounting the cover 6 to the outside member 1, the detected member 3 is precisely positioned so as to provide gaps d2 and d3 in the radial and axial directions, respectively, between the detected member 3 and the cover 6.

In addition to this precise positioning, the mounting of the integrated member is very simple, for it is not necessary to go through multiple steps in the assembly process of the bearing apparatus to mount the rotational speed detector to the outside member as is required with conventional axle bearing apparatuses in which a cover is first mounted to an outside member, and a rotational speed detector separate from the cover is then press fit into the cover.

There is a possibility that a clearance in the axial direction X between the detected member 3 and the end face of the detector portion 7a will be subject to change with time due to play in the of connection, shifting of the cover 6, and the like. However, this possible clearance change does not affect the sensitivity of the detector portion 7a so long as the distance d1 is not changed. This makes it unnecessary to make periodic adjustments in the position of the rotational speed detector along the axial direction X, as would be necessary in conventional arrangements in which the mounting direction of the rotational speed detector is identical to the direction in which the detector portion must be accurately positioned relative to the projections.

Due to the various features described above, the bearing apparatus of this embodiment can assure a high precision in detecting the rotational speed of wheels, and can maintain this high detection precision for an extended period of time.

It is to be noted that many variations and modifications of the above embodiment are possible. Some of them are as follows.

The connector is not limited to the above embodiment in which the opening is in a direction perpendicular to the axial direction. Rather the connector may also open in the axial direction or at any specific angle to the axial direction. Furthermore, the connector may be a preformed connector which may be integrated with the cover and the rotational speed detector during the molding process.

The position and thickness of the resin which is used to mold or connect the cover, the rotational speed detector, and the connector together shall also not be limited to the position and thickness described above, but may be selected as desired so long as high sealing performance and vibration resistance are provided in the manner described above.

Figure 4:
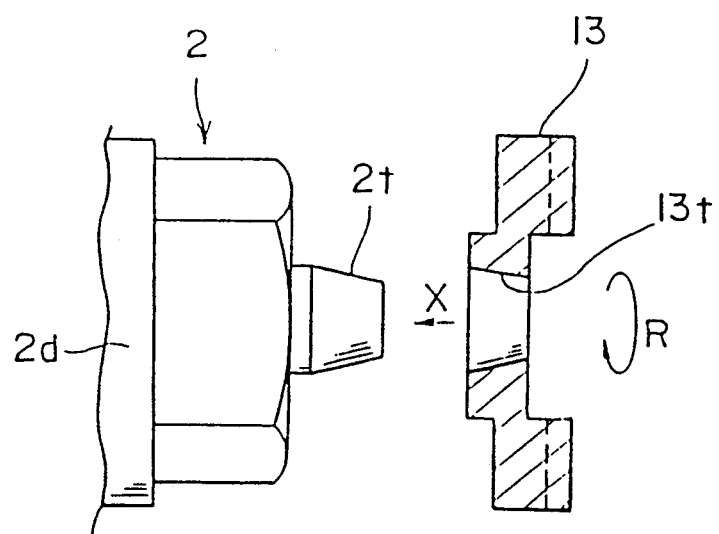
FIG. 4 diagram showing a modification of the detected member.

Furthermore, mounting of the detected member to the axle shaft shall not be limited to the press fitting. As shown in FIG. 4, a tapered member 2t may be provided on a driven shaft 2d of an inside member 2, and a tapered hole 13t may be formed at the center of a detected member 13 with a taper angle corresponding to the angle of the tapered member 2t. While the axle shaft 2d is turned in the direction of arrow R, the detected member 13 is pressed in the direction of arrow X to be fixed onto the tapered member 2t by friction welding.

In addition, locking of the nut 2i to the driven shaft 2d can also be achieved by fixing a ring member (not shown) onto the driven shaft adjacent to the nut in the axial direction by means of friction welding. In this case, the detected member having plural projections may be positioned next to or around the ring member.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A bearing apparatus for a driven shaft of an automobile having a suspension member with a fitting hole formed therein, comprising:

a cylindrical outside member adapted to be mounted to a chassis of the automobile in surrounding relation to the driven shaft;

a cylindrical inside member mounted concentrically within said cylindrical outside member and adapted to be fixed for rotation with the driven shaft;

means, comprising rolling elements, for rotatably mounting said cylindrical inside member within said cylindrical outside member for rotation relative to said cylindrical outside member;

a cylindrical detected member fixed to said cylindrical inside member for rotation therewith about an axis and having a hollow cylindrical portion which extends in an axial direction and has a plurality of projections spaced evenly apart in a circumferential direction of the hollow cylindrical portion on an inner peripheral surface of the hollow cylindrical portion;

sealing means for sealingly enclosing said cylindrical inside member and said rolling elements, said sealing mans comprising a cylindrical cover member having an opening in a free end thereof and being connected to the cylindrical outside member so as to cover the cylindrical detected member, said cover member having a maximum outside diameter which allows said cover member to be received in the fitting hole of the suspension member;

a rotational speed detector including means for detecting rotational speed of the cylindrical detected member and for generating a rotational speed signal indicative of the rotational speed of the driven shaft, said rotational speed detector being disposed within an outer periphery of said cylindrical outside member and being disposed within said opening in said free end of said cover member so that a central axis of said rotational speed detector is substantially coextensive with a central axis of said opening;

means, comprising a resin block connected to both said rotational speed detector and said cover member, for integrating said cover member and said rotational speed detector in such a manner that said means for detecting rotational speed is positioned within said hollow cylindrical portion and opposes said projections of said cylindrical detected member, said resin block being dimensioned such that it is mounted within said maximum diameter of said cover member;

wherein an outer circumference of an end of said cover member is fitted into an open end of said cylindrical outside member; and wherein said cover member surrounds a circumferential periphery of said detected member.

2. A bearing apparatus as recited in claim 1, wherein said maximum outside diameter of said cover member is smaller than a diameter of the fitting hole of the suspension member.

3. A bearing apparatus as recited in claim 2, wherein said cover member includes an outwardly protruding seat having an outside diameter equal to said maximum outside diameter of said cover member and which is seated on an end face of said cylindrical outside member.

4. A bearing apparatus as recited in claim 1, wherein said maximum outside diameter of said cover member is disposed within said outer periphery of said cylindrical outside member.

* * * * *